Dec. 26, 1961 L. L. SMITH 3,014,989

INCOMING TELEPHONE CALL PABX RESTRICTIVE SERVICE

Filed June 10, 1959 2 Sheets-Sheet 1

INVENTOR.
Lester L. Smith
BY C. R. Sipe
Atty.

Dec. 26, 1961 L. L. SMITH 3,014,989

INCOMING TELEPHONE CALL PABX RESTRICTIVE SERVICE

Filed June 10, 1959 2 Sheets-Sheet 2

INVENTOR.
Lester L. Smith
BY C. R. Sipe
Atty.

United States Patent Office 3,014,989
Patented Dec. 26, 1961

3,014,989

INCOMING TELEPHONE CALL PABX RESTRICTIVE SERVICE

Lester L. Smith, McHenry, Ill., assignor to Automatic Electric Laboratories, Inc., a corporation of Delaware Filed June 10, 1959, Ser. No. 819,379
8 Claims. (Cl. 179—26)

This invention relates in general to a telephone system, and more particularly to incoming telephone call PABX restrictive service.

In certain large Private Automatic Branch Exchanges (PABX) such as are used in an army camp or fort, it is desirable to prohibit main exchange or outside incoming calls to restricted telephone substations in the PABX and to permit only calls to come into unrestricted telephone substations. Although these substations are of the restricted type, it is desirable to limit their calls to PABX calls and may permit limited outgoing calls by a method described in my copending application Serial No. 797,477, filed March 5, 1959. In this manner only important official calls, incoming and outgoing are permitted.

It is therefore an object of this invention to provide a means for permitting incoming main exchange calls to unrestricted PABX substations while preventing incoming main exchange calls to restricted PABX substations.

It is another object of this invention to provide a PABX system with means to transfer all calls to restricted stations to a mechanical announcer to notify a calling party that the PABX substation called cannot be accessed.

It is another object of this invention to provide means to disconnect PABX equipment utilized in extending a call when said call is transferred to a mechanical announcer.

A feature of this invention resides in the utilization of an adapter circuit linked incoming to a PABX selector or numerical switch to register certain dialed digits received from a calling main exchange substation to determine if access can be made to certain PABX substations.

A further feature of the invention resides in the utilization of two wiper sets on a rotary switch in said adapter to impose restrictions on two separate PABX offices wherein a predetermined digit dialed determines which PABX office is being called and determines which wiper set corresponding thereto is to be effective to impose said restrictions.

Another feature of the invention resides in the utilization of a loop circuit through the above-described adapter which, upon receipt of a first digit over said loop circuit, cuts the adapter circuit into the circuit to start a checking function; checks to determine if a second digit has been dialed; and checks a third digit to determine if the call is to be restricted.

Figure 1:
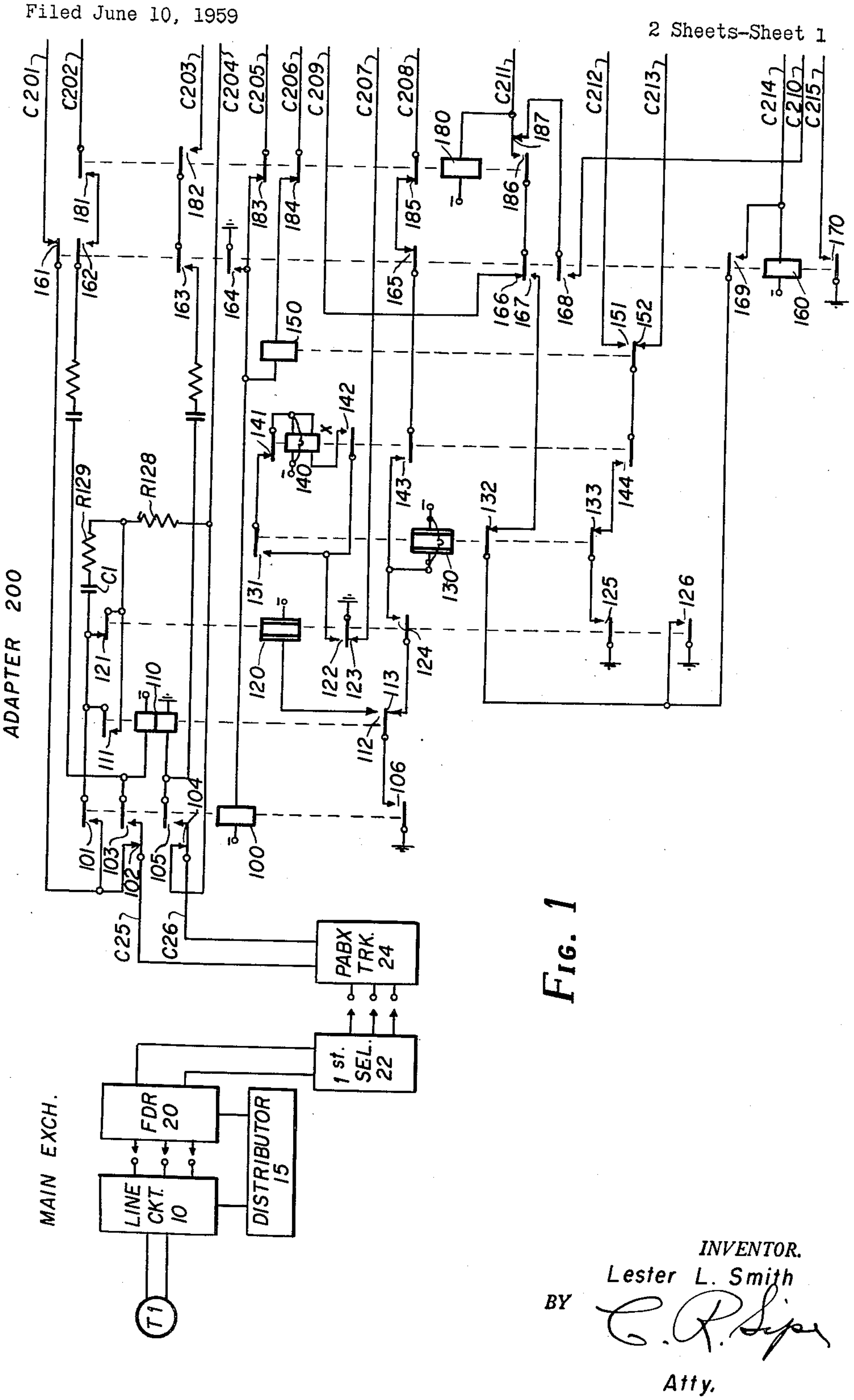
Figure 2:
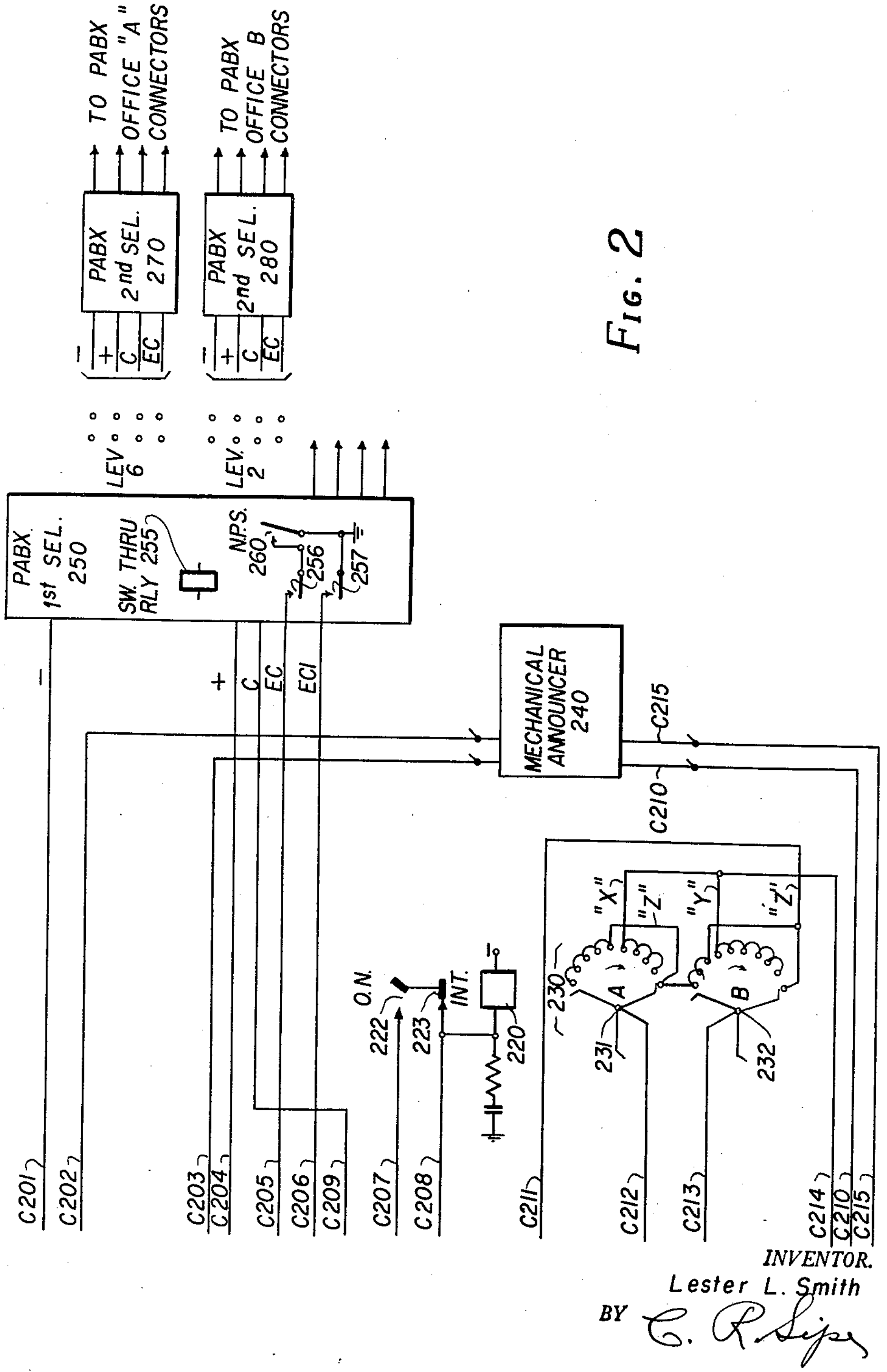

Other objects and features of the invention will become apparent from a perusal of the following detailed description taken in combination with accompanying drawings of which:

FIGS. 1 and 2, with FIG. 2 to the right of FIG. 1, depict the general layout of an adapter circuit and other equipment embodying the invention. More particularly, FIG. 1 shows a portion of the equipment in a main exchange accessible to the adapter circuit 200. FIG. 2 discloses a portion of the equipment in a PABX accessible through said adapter circuit.

Referring briefly to the drawings, a main exchange, including a portion of the equipment therein for extending connections within this exchange is shown. A subscriber substation T1 of the main exchange is shown, containing therein the usual telephone handset and dial (not shown) for transmitting digital impulses. A line circuit 10 for substation T1, a distributor 15, line finder 20, and first selector 22, all of conventional design, comprise for explanatory purposes a small portion of the equipment in this exchange. A PABX trunk 24 accessible on any predetermined level of selector 22 will constitute the path over which the private automatic branch exchanges are accessed. For exemplary purposes, two PABX paths will be described, namely, to PABX office A and to PABX office B. Access to PABX office A will be assumed to be over the upper five levels of bank contacts on a PABX first selector 250, and access to PABX office B will be assumed to be over the lower five levels thereof.

An adapter circuit 200 comprising the crux of this invention is interposed between the PABX trunk 24 and PABX first selector 250, with the adapter circuit in its normal position as shown acting as the link extending the loop between these mentioned pieces of equipment Dialing a first digit over this loop to the selector initiates conditioning of the adapter circuit to check the further receipt of digital impulses, and, after the seizure of a second selector by the first selector, where a switch-through relay 255 in first selector 250 is operated. The adapter circuit will thereafter act as a repeater to repeat further digital impulses to succeeding equipment. Upon receipt of a second digit, the adapter circuit will be further conditioned to register a following digit, more particularly to register a tens digit on the banks of a rotary switch 230. Referring briefly to the rotary switch 230, two sets of wipers 231 and 232 with corresponding bank contacts with specific strapping thereon are utilized to determine the restriction or non-restriction. Since, as mentioned, it is the tens digits that are checked for restrictions, these tens digits would correspond to an entire level on a connector bank. Therefore, if a tens digit is to be restricted, all PABX substations associated with that level on the connector would be restricted. Level A containing wiper 231 will impose restrictions to PABX office B and level B containing wiper 232 will impose the restrictions to PABX office A. Therefore, only when the wipers of PABX selector 250 step to trunks accessible to office A will the wiper 232 be effective, and only when the wipers of selector 250 step to trunks accessible to office B will wiper 231 be effective. Level A on rotary switch 230 contains strapping "X" and "Z" connected to certain bank contacts, wherein the "X" wiring is connected to contacts 6–9 for restricting a call, and the "Z" wiring is connected to contacts 1–5 and 10 for non-restriction. Likewise, level B on the rotary switch 230 contains strapping "Y" and "Z" connected to certain bank contacts, wherein the "Y" wiring is connected to contacts 4–9 for restricting calls, and the "Z" wiring is connected to contacts 1–3 and 10 for non-restriction. Therefore, restrictions are imposed against different dialed digits to the different offices. On dialing a restricted directory digit, the rotary switch 230 will function to initiate the transfer of the call to a mechanical announcer 240 wherein a recorded message will be transmitted to the calling party notifying him that the called PABX substation is inaccessible by an outside caller. On dialing a non-restricted tens digit the adapter circuit 200 will release from further digital respondence. It should be apparent that should more levels on the PABX connector necessitate restrictions, the "X" and "Y" wiring could be strapped to certain bank contacts occupied by the "Z" wiring, and, likewise, should less restrictions be desirable, the "Z" wiring could be strapped to bank contacts occupied by the "X" and "Y" wiring. A more detailed explanation will now follow, wherein the above general disclosure will become better understood.

*Call to PABX office A*

Assuming that a main exchange subscriber at substation T1 desires to make a call to a PABX subscriber in PABX office A, the removal of the handset will cause the calling party's line circuit 10 to operate a distributor 15 to start an idle line finder, such as 20. The line finder 20 will in turn seize the line circuit 10 in a conventional manner to connect an idle first selector 22 to the calling party's telephone loop circuit.

As previously mentioned, in order for the calling party to make a PABX call, a PABX trunk must be seized, such as PABX trunk 24. It will therefore be assumed that the calling party at substation T1 dials a first digit into the first selector 22 corresponding to the PABX directory number of the party wanted. Selector 22 will thereby step its wipers in a conventional manner and rotate in search of an idle PABX trunk. Assuming the seizure of PABX trunk 24 linked with a PABX selector 250 via a PABX restrictor or adapter 200, the loop circuit will be extended to a line relay (not shown) in selector 250 over a path including battery (not shown), a first winding of the line relay (not shown), conductor C201 of adapter 200, contacts 161, 102, conductor C25, PABX trunk 24, selector 22, the calling line equipment, the calling loop and calling party's handset, PABX trunk 24, conductor C26, contacts 104, conductor C204, a second winding of the line relay to ground. This line relay will thus operate, and close ground back over control conductor C209 all in a well known manner. This last-mentioned ground is ineffective, however, at this time.

As previously mentioned, calls to PABX office A would be accessed through the upper five levels on selector 250 therefore requiring the receipt of a second digit from "6"–"0." Assuming that the called party's second directory number is the digit "6," upon receipt of the six digital impulses, the line relay in selector 250 is pulsed six times to initiate the stepping of the wipers of selector 250 to the sixth level of bank contacts, and rotate thereover in search of a second PABX selector in a well known manner.

When the wipers of selector 250 are stepped to the sixth level, the normal post springs operate to close NPS contacts 260 to prepare a circuit to relay 100. When an idle second PABX selector, such as 270, is seized, the switch-through relay 255 operates in selector 250 in a well known manner to close contacts 256 and 257 to extend ground over EC conductor C205 and EC1 conductor C206 respectively, to operate relay 100. The ground on conductor C206 also extends through relay 150. However, the ground on conductor C205 shunts relay 150 to prevent operation thereof.

Relay 100 operates, closing at contacts 103 and 105 the incoming loop circuit to relay 110. At contacts 102 and 104, the loop circuit to the succeeding equipment is opened. However, at contacts 101 a resistor R128 is placed across the succeeding loop circuit via contacts 121, to hold the succeeding equipment. Thereafter, relay 110 operates over the incoming loop closing contacts 111 to provide an alternate path for maintaining the succeeding loop circuit closed. At contacts 106 and 112, relays 100 and 110, respectively, close an obvious circuit to relay 120. Relay 120 operates, opening at contacts 121 one of the succeeding loop alternate holding paths. Contacts 122 close to prepare a circuit to relay 140. Contacts 124 close to prepare circuits to relay 130 and rotary stepping magnet 220. At contacts 125 a ground circuit is prepared to wiper 232 of rotary switch 230. Contacts 126 close to prepare locking circuits to relays 160 and 180.

Upon receipt of the third dialed digit, line relay 110 will follow the digital impulse series by intermittently releasing a number of times corresponding to the numerical value of the dialed digit. Each time relay 110 releases contacts 111 will open the succeeding loop circuit to thus pulse the line relay in selector 270 to step the wipers therein accordingly. At contacts 112 the circuit to relay 120 is opened. However, relay 120 is of the slow-to-release type and will remain operated during pulsing. At contacts 113, a circuit is closed to relay 130 via contacts 106 and 124. Relay 130 also of the slow-to-release type will remain operated during the intermittent opening of contacts 113. At contacts 131, relay 130 closes a circuit to relay 140 via ground, contacts 122, 131, 141, upper winding of relay 140 to battery. Relay 140 will energize sufficiently to close its "X" contacts 142 to short circuit the lower winding of relay 140 and prevent the remaining contacts thereof from operating. At the end of the digital impulse series relay 110 reoperates completely opening at contacts 113 the circuit to slow-to-release relay 130. After a short time interval, relay 130 releases, opening contacts 131 wherein relay 140 will energize fully through its lower winding. Contacts 141 further opens the original operating circuit to relay 140. At contacts 143 a circuit is prepared to rotary magnet 220. At contacts 144 ground is closed to wiper 232 via contacts 125, 133, 144, 152, and conductor C213.

The next digit is the tens digit corresponding to the called parties directory number whereby the "X," "Y," and "Z" strapping is effective on this digit as previously disclosed. Since this is assumed to be a call to office A only the "Y" and "Z" wiring will be effective corresponding to wiper 232.

Assuming that the call is to an unrestricted PABX subscriber, any bank contact on level B having the "Z" wiring connected thereto can be dialed; in this case the digits "1," "2," "3," or "0." For exemplary purposes, we will assume that the digit "3" is to be utilized as part of the directory number. Upon receipt of the tens digit "3," line relay 110 will intermittently restore three times wherein, at contacts 113, a pulsing circuit is intermittently closed to rotary magnet 220 from ground, contacts 106, 113, 124, 143, 165, 185, conductor C208, winding of rotary magnet 220 to battery. For each ground pulse received by magnet 220, the wipers 231 and 232 will take one clockwise step simultaneously with the wipers in the seized PABX connector (not shown) repeated via contacts 111 as previously described. Over the pulsing circuit to rotary magnet 220 the circuit to relay 130 is reclosed whereby, at contacts 132, a prepared locking circuit to relay 180 is opened. At contacts 133, the ground to wiper 232 is opened to prevent false operation of relay 160 during the stepping of wiper 232 over the bank contacts of rotary switch 230. The ON springs operate on the first rotary step of the wipers to close ON contacts 222 to prepare a homing circuit for rotary switch 230. Also, each time rotary magnet 220 is energized, the interrupter springs operate, opening interrupter contacts 223, without effect, however, at this time. As previously mentioned, relays 120 and 130 will remain operated during pulsing due to their slow-to-release characteristics.

At the end of the last-mentioned impulse series, wipers 231 and 232 will be engaging their respective third bank contacts, relay 110 will reoperate completely, and after a short duration, relay 130 will restore and rotary magnet 220 will deenergize. The restoration of relay 130 at contacts 133 will close a circuit to relay 180 from ground, contacts 125, 133, 144, 152, conductor C213, wiper 232, third bank contact on level B of rotary switch 230, "Z" wiring, winding of relay 180 to battery. Relay 180 operates, closing at contacts 186 a locking circuit for relay 180 via contacts 166 and to ground on control conductor C209. Contacts 181 and 182 close, however, without effect on an unrestricted call. Contacts 183 and 184 open the circuit to relay 100. At contacts 185 the prepared circuit to rotary magnet 220 is further opened. Relay 100 restores, opening at contacts 103 and 105 the circuit to line relay 110. Contacts 106 opens the circuit to relay 120. At contacts 102 and 104, the loop circuit is closed to the seized connector independent of the adapter circuit. Relay 110 restores, and after a short interval, slow-to-release relay 120 restores, opening at contacts 123 the circuit to relay 140 which also restores. At contacts 123 a self-interrupter circuit is closed via conductor C207, ON contacts 222, interrupter contacts 223 to the winding of rotary magnet 220. By means of its self-interrupter contacts 223, rotary magnet 220 will self-interruptedly step the wipers 231 and 232 to their respective normal positions thereby opening ON contacts 222 to deenergize rotary magnet 220. When relay 120 restored, it also opened, at contacts 125, the original operating circuit to relay 180. However, relay 180 remains operated over its mentioned locking circuit. It is to be understood that the adapter circuit would respond to a tens digit "1," "2," or "0" in the like manner described above.

The last digit dialed would thus be responded to by the connector in the PABX to extend the call to the called party in a well known manner and independently of the adapter circuit.

Assuming that the call is to a restricted line which would comprise the tens digits "4"–"9," the "Y" wiring would be effective to block the call and transfer the loop circuit to the mechanical announcer. Assuming that the calling party dials the digit "4" as the tens digit, rotary magnet 220 would step the wipers 231 and 232 to their respective fourth bank contacts in a manner previously described. When relay 130 restores at the termination of this digital impulse series, contacts 133 would close a circuit to relay 160 instead of 180 over a circuit comprising ground, contacts 125, 133, 144, 152, conductor C213, wiper 232, fourth bank contact of level B, "Y" wiring, winding of relay 160 to battery. Relay 160 operates, opening at contacts 161 the loop circuit to the seized connector to release the succeeding equipment in a well known manner. Contacts 162 and 163 close to prepare a loop circuit to the mechanical announcer 240. Contacts 164 close an obvious multiple ground to relay 100. At contacts 165 the circuit to rotary magnet 220 is further opened. At contacts 168, conductor C210 is closed to relay 180. Contacts 167 close to prepare a locking circuit to relay 180. At contacts 169 relay 160 closes a locking circuit for itself to ground at contacts 126. At contacts 170 ground is closed to the mechanical announcer start lead C215 to start the mechanical announcer 240 which, in turn, causes the mechanical announcer 240 to transmit a ground pulse in any well-known manner back over conductor C210 at the start of the recorded message causing relay 180 to operate via contacts 168 and 187. At contacts 181 and 182, relay 180 closes the talking loop circuit to the mechanical announcer 240. At contacts 183 and 184, the EC and EC1 conductors are disconnected from the succeeding switch. At contacts 186, relay 180 locks operated via contacts 167, 132, and 126 to ground. Contacts 187 of relay 180 open its original operating circuit, but it will remain operated over the above-mentioned locking circuit. The recorded message from the mechanical announcer 240 will notify the calling party that a restricted party has been called and access cannot be had. The calling party would thus proceed to hang up to release the circuit in a manner to be described under the succeeding heading entitled Release.

*Calls to office B*

A call to office B would be made in the same manner as a call to office A, except the first digit dialed into selector 250 must be a digit "1"–"5." For exemplary purposes it will be assumed that the digit "2" is dialed wherein the wipers of selector 250 will step to the second level of bank contacts and rotate in search of an idle second selector, such as 280. On this level the normal post springs 260 will not operate whereby, when switch-through relay 255 operates to switch the call through to a second selector, ground will be extended back only via contacts 257 to cause relay 150 to operate in series with relay 100. Relay 150 operating opens contacts 152 extending to wiper 232 and prepares, at contacts 151, a ground to wiper 131. Relays 100, 110, and 120 will operate as previously described. Thus, only level A of rotary switch 230 will be effective to determine if the call will be restricted or not by the utilization of the "X" and "Y" wiring. The restricted tens digit being the digits "6"–"9" as designated by the "X" wiring, and the unrestricted tens digits being the digits "1"–"5" and "0" as designated by the "Z" wiring on level A of rotary switch 230. Therefore, the operations for restricting an incoming call to PABX office B restricted substations would be identical to that described in Calls to Office A with the exception of the tens digits utilized, since in actually the "X" and "Y" wiring are connected together and perform the same operations. Furthermore, the only difference other than the digits utilized for restricting calls, would be the operation of relay 150 to change rotary switch wipers on calls to PABX office B.

*Release—office A, B or mechanical announcer*

Assuming first the release of a call when the calling party disconnects after receiving the recorded message from the mechanical announcer 240, the loop circuit to relay 110 is opened. Relay 110 restores, opening at contacts 112 the circuit to relay 120. Relay 120 restores, opening at contacts 122 the locking circuit to relay 140. At contacts 123 an obvious self-interrupter circuit to rotary magnet 220 is closed. At contacts 126 the locking circuit to relays 160 and 180 are opened to cause restoration thereof. Rotary magnet 220 will thus self-interruptedly step the wipers 231 and 232 to their respective normal positions wherein ON contacts 222 open to deenergize the rotary magnet. The restoration of relay 160 at contacts 164 will open the circuit to relay 100 to cause restoration thereof. At contacts 170 relay 160 opens the start circuit to the mechanical announcer 240 to stop the recorded announcement. The adapter circuit is thus at normal.

On the termination of a call to PABX offices A or B, when the parties hang up, a chain reaction will occur to release the succeeding equipment in a well-known manner. When first selector 250 restores its wipers, the normal post springs 260 open (if previously operated) to restore relay 100 and 150 (if operated). The remainder of the releasing operation will be the same as that described above.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a calling substation, a branch exchange, a plurality of restricted substations and a plurality of unrestricted substations in said branch exchange, a numerical switch, means for extending a connection from said calling substation to said numerical switch, an adapter circuit normally excluded from said connection, means for operating said numerical switch in response to receipt of a first dialed digit to further extend said connection, means in said adapter circuit controlled from said numerical switch in response to said further extension of said connection for including said adapter circuit in said connection and for conditioning said adapter to respond to additional digits dialed by said calling substation, means in said conditioned adapter circuit for thereafter repeating all subsequent dialed digits over said extended connection, checking means in said adapter circuit for checking a predetermined digit of a called substation's directory number, means in said adapter operated in response to the dialing of a second digit by said calling substation for conditioning said checking means to respond to a third dialed digit by said calling substation, said checking means operated in response to receipt of said third dialed digit for determining if said third digit corresponds to a restricted substation or to an unrestricted substation, and blocking means operated in case said checked digit corresponds to a restricted station for blocking further extension of said call.

2. A telephone system as claimed in claim 1, including means operated in case said checked digit corresponds to an unrestricted substation for rendering said conditioning of said adapter circuit ineffective to further digital response and the desired extension of said connection to said unrestricted substation is subsequently completed.

3. In a telephone system, a main exchange, a calling substation in said main exchange, a branch exchange including a plurality of restricted and unrestricted substations, a plurality of numerical switches in said branch exchange, main exchange switching means for extending a connection from said calling substation to a first one of said numerical switches in response to said calling substation dialing a first digit of a call number of one of said branch exchange substations, an adapter circuit normally excluded from said connection, means in said first numerical switch operated in response to said calling substation dialing a second digit of said call number of said one branch exchange substation for extending said connection to seize a second numerical switch, a relay in said adapter circuit, means in said first numerical switch operated in response to said seizure of said second numerical switch for operating said relay, means operated by said relay for including said adapter circuit in said connection between said main exchange switching means and said first numerical switch to condition said adapter circuit to respond to subsequent dialed digits, checking means in said adapter circuit for checking a predetermined digit in the directory number of a called substation, means operated in response to said calling substation dialing a third digit of said call number of said one branch exchange substation for conditioning said checking means to respond to the subsequent dialing of a fourth digit of said call number of said one branch exchange substation by said calling substation, a blocking relay and a releasing relay in said adapter circuit, said checking means operated in response to the dialing of said fourth digit for determining if said fourth digit corresponds to the directory number of a restricted substation or an unrestricted substation, means including said blocking relay operated by said checking means in case said fourth digit corresponds to the directory number of a restricted substation for blocking further extension of said call, and means including said releasing relay operated by said checking means in case said fourth digit corresponds to the directory number of an unrestricted substation for releasing said adapter circuit from further digital response, whereby extension of said connection to said unrestricted substation may thereafter be completed.

4. In a telephone system, a main exchange, a calling substation in said main exchange, a first branch exchange and a sceond branch exchange, a plurality of restricted and unrestricted substations in each branch exchange, a numerical switch common to each branch exchange for extending connections thereto, means for extending a connection from said calling substation to said numerical switch in response to said calling substation dialing the first digit of a call number of one of said branch exchange substations, an adapter circuit normally excluded from said connection, means for including said adapter circuit in said connection subsequent to the dialing of a second digit of a call number of said one branch exchange substation by said calling substation, means including a rotary switch having a pair of wipers in said adapter circuit for checking a predetermined digit of each directory number of called branch exchange substations, means including one of said wipers for checking said predetermined digits corresponding to said first branch exchange substations and said second wiper for checking said predetermined digits corresponding to said second branch exchange substations, a circuit including means in said adapter circuit operated in response to the dialing of a third digit of a call number of said one branch exchange substation by said calling substation for connecting only the wiper corresponding to the called branch exchange for checking a subsequent dialed digit, means operated in response to said dialing of said third by said calling substation to condition said rotary switch to respond to a subsequent fourth dialed digit, means in said rotary switch operated in response to receipt of said fourth dialed digit for stepping said pair of wipers to engage bank contacts corresponding to the digit dialed, means including blocking means operated in case said connected wiper engages the bank contact corresponding to a restricted called branch exchange substation for blocking further extension of said call, and means including releasing means operated in response to said connected wiper engaging a bank contact corresponding to an unrestricted called branch exchange substation for releasing said adapter circuit from subsequent digital response, whereby extension of the connection to the unrestricted substation may subsequently be completed independent of said adapter circuit.

5. In a telephone system, a main exchange, a calling substation in said main exchange, a plurality of restricted and unrestricted substations in a branch exchange, a first numerical switch in said branch exchange, other numerical switches in said branch exchange accessible by said first numerical switch, means for extending a loop circuit from said calling substation to said first numerical switch in response to said calling substation dialing the first digit of a call number of one of said branch exchange substations, an adapter circuit normally excluded from said connection, said first numerical switch controlled over said loop circuit in response to said calling substation dialing the second digit of said call number of said one branch exchange substation for selecting one of said other numerical switches, means for including said adapter circuit in said loop circuit in response to said selection of said other numerical switch, splitting means in said adapter circuit operated in response to said inclusion in said loop circuit for splitting said extended loop circuit into an incoming section from said calling substation and an outgoing section to said first and said other numerical switches, means in said adapter circuit for repeating impulses corresponding to subsequent dialed digits to said other numerical switch over said second outgoing section, digit checking means in said adapter circuit for checking the subsequent dialed digit of said call number of said one called branch exchange substation, means operated in response to said calling substation dialing the third digit of said call number of said one branch exchange substation for conditioning said digit checking means to respond to a subsequent fourth dialed digit, said digit checking means operated in response to said fourth dialed digit for determining if said fourth digit corresponds to the directory number of a restricted or unrestricted substation, and release means operated in case said checked fourth digit corresponds to an unrestricted substation for restoring said splitting means to re-establish said loop circuit to said succeeding trunks and for releasing said adapter circuit from further digital response.

6. In a telephone system, a calling substation, a first branch exchange and a second branch exchange, a plurality of restricted and unrestricted substations in each branch exchange, a numerical switch for extending a connection to either branch exchange, means for extending a connection from said calling substation to said numerical switch in response to said calling substation dialing the first digit of a call number of one of said branch exchange substations, an adapter circuit normally excluded from said connection, means for including said adapter circuit in said connection subsequent to the dialing of the second digit of said call number of said one branch exchange substation by said calling substation, directively operated switching means in said adapter circuit for registering a predetermined dialed digit of a series corresponding to a particular call number of one of said branch exchange substations, pulsing means in said adapter, means for operating said pulsing means to extend said connection from said numerical switch to the branch exchange corresponding to said one branch exchange substation in response to receipt of the third dialed digit by said calling substation, relay means operated by the operation of said pulsing means in response to the dialing of said third digit by said calling substation for conditioning said directively operated switching means to respond to a subsequent dialed fourth digit, disabling means, said directively operated switching means thereafter operated in response to receipt of said fourth dialed digit of said call number in case said one branch exchange substation is an unrestricted substation for operating said disabling means, means operated by said disabling means for removing said conditioning from said directively operated switching means to permit receipt of subsequent dialed digits without response thereby, and blocking means controlled by the operation of said directively operated switching means in response to the receipt of said fourth dialed digit in case said one branch exchange substation is a restricted substation for releasing said connection to block further extension of said call.

7. In a telephone system as claimed in claim 6, including determining means in said adapter circuit controlled from said numerical switch upon receipt of said second dialed digit for determining whether said first branch exchange substations or said second branch exchange substations are to be checked, and for determining that only calls to restricted substations of the selected branch exchange are to be blocked.

8. In a telephone system, a calling substation in a main exchange, a first branch exchange and a second branch exchange, a numerical switch for completing connections to either branch exchange, means for extending a connection from said calling substation to said numerical switch, an adapter circuit, means controlled by a specific operation of said numerical switch for including said adapter circuit in said extended connection, a rotary switch in said adapter circuit comprising a pair of wipers having contact banks accessible thereby for checking a predetermined dialed digit of each directory number of called branch exchange substations, said first contact bank having a first plurality of contacts corresponding to unrestricted substations in said first branch exchange, said second contact bank having a first plurality of contacts corresponding to restricted substations in said second branch exchange and a second plurality of contacts corresponding to unrestricted substations in said second branch exchange, conditioning means operated in response to the further extension of said connection from said numerical switch in response to the receipt of a second dialed digit corresponding to either said first or second branch exchange for conditioning said adapter circuit to respond to subsequent dialed digits, means operated in response to receipt of said second dialed digit for preparing a circuit to select the rotary wiper corresponding to the branch exchange to which the call is to be extended, means operated in response to a third dialed digit from said calling substation for conditioning said rotary switch to respond to a subsequent fourth dialed digit, means for operating said rotary switch in response to a fourth dialed digit for stepping said wipers to engage their respective bank contact corresponding to the numerical value of said fourth digit, and blocking means controlled over said prepared circuit by said selected wiper engaging said bank contact in the plurality corresponding to a restricted substation for blocking further extension of said call.

References Cited in the file of this patent

UNITED STATES PATENTS

| | | |
|---|---|---|
| 2,876,291 | Barker | Mar. 3, 1959 |
| 2,892,890 | Pharis | June 30, 1959 |
| 2,916,555 | Gatzert | Dec. 8, 1959 |